US010078676B2

(12) United States Patent
Bhagat et al.

(10) Patent No.: US 10,078,676 B2
(45) Date of Patent: Sep. 18, 2018

(54) SCHEMA EVOLUTION IN MULTI-TENANT ENVIRONMENT

(71) Applicant: SAP SE, Walldorf (DE)

(72) Inventors: Prashant Bhagat, Cupertino, CA (US); Ketan Bengali, Walldorf (DE); Sushant Prasad, Sunnyvale, CA (US); Dennis Lee, Walldorf (DE); Harshad Chavan, Cupertino, CA (US); Kiran Gangadharappa, Mountain View, CA (US); Dinesh Shahane, Cupertino, CA (US)

(73) Assignee: SAP SE, Walldorf (DE)

( * ) Notice: Subject to any disclaimer, the term of this patent is extended or adjusted under 35 U.S.C. 154(b) by 295 days.

(21) Appl. No.: 14/737,332

(22) Filed: Jun. 11, 2015

(65) Prior Publication Data

US 2016/0292192 A1 Oct. 6, 2016

Related U.S. Application Data

(60) Provisional application No. 62/143,641, filed on Apr. 6, 2015.

(51) Int. Cl.
*G06F 17/30* (2006.01)

(52) U.S. Cl.
CPC .. *G06F 17/30569* (2013.01); *G06F 17/30292* (2013.01)

(58) Field of Classification Search
CPC ......... G06F 17/30292; G06F 17/30569; G06F 17/30; G06F 17/30094; G06F 17/3087; G06F 17/30076; G06F 17/30209; G06F 17/30312; G06F 17/30215; G06F 17/30306; G06F 17/30557; G06F 9/50; G06F 17/30336; G06F 17/30604; G06F 9/45558; G06F 17/30958; G06F 9/45579; G06F 9/45583; G06F 3/04845
See application file for complete search history.

(56) References Cited

U.S. PATENT DOCUMENTS

| 5,212,789 | A * | 5/1993 | Rago | G06F 17/30377 |
| | | | | 707/E17.032 |
| 6,272,503 | B1* | 8/2001 | Bridge, Jr. | G06F 17/30952 |
| | | | | 707/E17.037 |
| 7,769,904 | B2* | 8/2010 | Eller | G06F 17/2247 |
| | | | | 709/200 |

(Continued)

*Primary Examiner* — Anh Ly
(74) *Attorney, Agent, or Firm* — Schwegman Lundberg & Woessner, P.A.

(57) ABSTRACT

In an example embodiment, primary data is received from a first tenant in a computer network, the primary data formatted based on a first version of a schema. Then a schema definition for the first version of the schema is obtained. The primary data is then parsed, the parsing including storing a schema version number for the first version of the schema. The primary data is indexed, by obtaining, using the schema version number for the first version of the schema, a schema definition for a most recent version of the schema; applying schema evolution to the primary data by applying one or more transforms to the primary data, the one or more transforms created using the schema definition for the first and most recent versions of the schema, causing the primary data to be converted to the most recent version of the schema; and indexing the converted primary data.

20 Claims, 8 Drawing Sheets

(56) References Cited

U.S. PATENT DOCUMENTS

| | | | | |
|---|---|---|---|---|
| 8,484,208 B1* | 7/2013 | Raghavan | G06F 17/30941 | 707/728 |
| 8,700,659 B2* | 4/2014 | Skeen | G06F 3/0484 | 707/754 |
| 9,043,278 B1* | 5/2015 | Wilson | G06F 17/30575 | 707/626 |
| 9,639,562 B2* | 5/2017 | Raitto | G06F 17/30292 | 707/803 |
| 2005/0071359 A1* | 3/2005 | Elandassery | G06F 17/30297 | 707/E17.005 |
| 2005/0149543 A1* | 7/2005 | Cohen | G06F 17/30297 | 707/E17.014 |
| 2006/0166725 A1* | 7/2006 | Saffari | G07F 17/32 | 707/E17.004 |
| 2007/0226196 A1* | 9/2007 | Adya | G06F 17/30457 | 707/E17.005 |
| 2008/0071806 A1* | 3/2008 | Gaurav | G06F 17/2247 | 707/E17.012 |
| 2008/0071817 A1* | 3/2008 | Gaurav | G06F 8/71 | 707/E17.126 |
| 2008/0077850 A1* | 3/2008 | Gauthier | G06F 17/218 | 715/234 |
| 2008/0104104 A1* | 5/2008 | Nolan | G06F 17/30011 | 707/E17.127 |
| 2009/0063584 A1* | 3/2009 | Abzarian | G06F 8/71 | 707/E17.005 |
| 2009/0094273 A1* | 4/2009 | Uchida | G06F 17/30914 | 707/E17.012 |
| 2009/0150439 A1* | 6/2009 | Gejdos | G06F 19/322 | 707/E17.044 |
| 2009/0198727 A1* | 8/2009 | Duan | G06F 17/30297 | 707/E17.044 |
| 2010/0174564 A1* | 7/2010 | Stender | G06Q 40/08 | 705/4 |
| 2011/0258225 A1* | 10/2011 | Taylor | G06F 17/30336 | 707/769 |
| 2012/0102065 A1* | 4/2012 | Williamson | H04W 4/02 | 707/769 |
| 2013/0013648 A1* | 1/2013 | Monjas Llorente | G06F 17/30483 | 707/803 |
| 2013/0218898 A1* | 8/2013 | Raghavan | G06F 17/30404 | 707/741 |
| 2013/0218899 A1* | 8/2013 | Raghavan | G06F 17/30958 | 707/741 |
| 2013/0290249 A1* | 10/2013 | Merriman | G06F 17/30584 | 707/610 |
| 2014/0280373 A1* | 9/2014 | Raitto | G06F 17/30292 | 707/803 |
| 2014/0372702 A1* | 12/2014 | Subramanyam | G06F 12/0848 | 711/129 |
| 2015/0227533 A1* | 8/2015 | Goldstein | G06F 17/30377 | 707/661 |
| 2017/0116232 A1* | 4/2017 | Marwah | G06F 17/30306 | 707/E17.008 |
| 2018/0011859 A1* | 1/2018 | Hallinan | G06F 17/3056 | 707/E17.009 |
| 2018/0107586 A1* | 4/2018 | Vyas | G06F 11/3668 | 707/E17.037 |

* cited by examiner

SCHEMA EVOLUTION IN MULTI-TENANT ENVIRONMENT

CROSS-REFERENCE TO RELATED APPLICATION

This application is a Non-Provisional of and claims the benefit of priority under 35 U.S.C. § 119(e) from U.S. Provisional Application Ser. No. 62/143,641, entitled "SCHEMA EVOLUTION IN MULTI-TENANT ENVIRONMENT," filed on Apr. 6, 2015 which is hereby incorporated by reference herein in its entirety.

TECHNICAL FIELD

This document generally relates to methods and systems for use with computer networks. More particularly, in example embodiments, this document relates to evolving schemas in a multi-tenant environment.

BACKGROUND

The indexing and searching of structured data are important functionalities for many businesses on both sides of sales transactions. For example, sellers may provide access to catalog data (including, for example, product information on various products for sale) to buyers to allow buyers to select items to purchase or contract for. This type of usage is especially prevalent for businesses, which often procure items in large quantities directly from a supplier. Traditionally, such structured data was stored in dedicated databases. An authorized buyer, for example, would gain viewing access to a supplier's database and thus be able to search directly the products in the database.

Recently there has been increased movement of data to the cloud. In such cloud environments, there is a lot more data (in both quantity and size) to be stored. This can complicate the process of indexing the data in order for it to be efficiently stored and searched. Additionally, in such a system it is desirable to allow tenants to customize schemas of particular record types, allowing for each tenant to have a different schema. When a schema is modified, such as by adding a new column, it is common to take the entire database offline in order to perform the update, and then restart all servers (typically in a specific order). The updating includes not only changing the old data to the new schema (by, for example, adding the column to all the old data) but also adding default values for the new aspects of the schema (e.g., default values for the new column). This adds downtime and complexity to the process of updating a schema.

BRIEF DESCRIPTION OF DRAWINGS

The present disclosure is illustrated by way of example and not limitation in the following figures.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

In an example embodiment, evolution of schema in a multi-tenant environment is performed using schema versioning and schema evolution. Each record is tagged with a schema version number, and the schema definition for that schema version number is stored separately. Whenever a change is made affecting the schema (such as, for example, adding a new product, object, or attribute), a new schema version number is created. During a parsing/indexing stage, when a record is read, it gets reconstructed using the schema definition for the schema version associated with the record. Then the record gets transformed into the latest schema version by applying one or more transformation rules. As such, when records are searched, the latest schema version is searched, and the update of the record to the latest schema version occurs during runtime without the database suffering any downtime.

Figure 1:
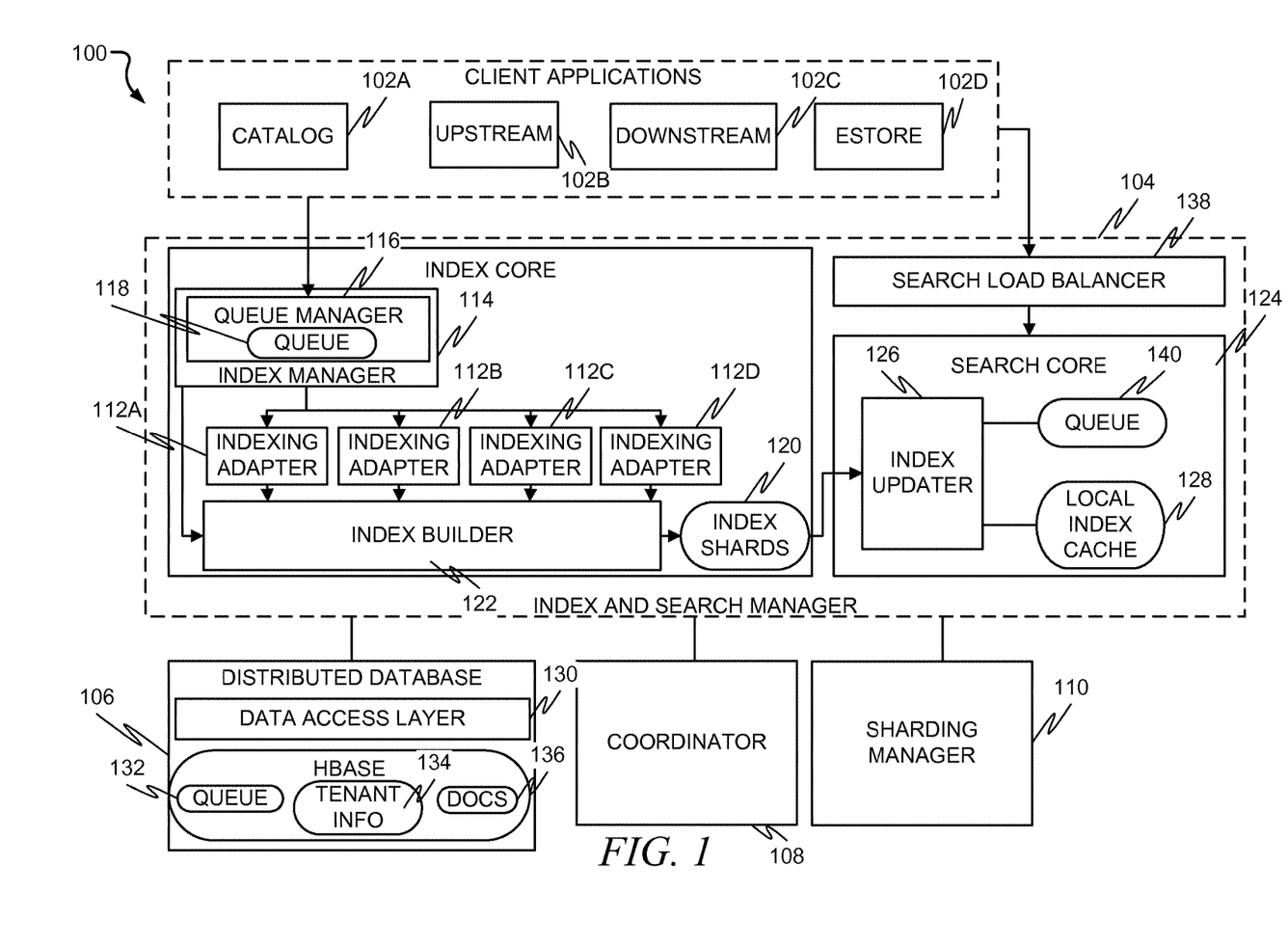
FIG. 1 is a block diagram illustrating a system, in accordance with an example embodiment, for indexing and searching structured data.

FIG. 1 is a block diagram illustrating a system 100, in accordance with an example embodiment, for indexing and searching structured data. The system 100 includes one or more client applications 102A, 102B, 102C, 102D; an index and search manager 104; a distributed database 106; a coordinator 108; and a sharding manager 110. Each client application 102A, 102B, 102C, 102D may represent a different application providing data to be indexed and eventually searched by the system 100. A single tenant (e.g., a customer such as a company) may provide multiple clients, while other tenants may provide just a single client. In the depicted figure, the client application 102A is or includes a catalog application, the client application 102B is or includes an upstream application, the client application 102C is or includes a downstream application, and the client application 102D is or includes an eStore application.

The client applications 102A, 102B, 102C, 102D may provide one or more of three different types of data streams (not pictured). Each data stream may have its own different data with a distinct lifecycle and purpose. These data streams may be known as primary, auxiliary, and relevance and ranking (R/R). The primary data stream may include primary data, which is the data that is the main subject of indexing and searching. The auxiliary data stream may include data that is not directly indexed or searched but may enrich the primary data. The R/R data stream may include R/R data, which is data that plays a role in relevance and ranking of primary data items during searching. As illustrative examples, if the client application 102A provides a catalog, the primary data may include Catalog Interchange Format (CIF) and Catalog Extensible Markup Language (cXML) catalogs, with the auxiliary data including supplier records, type definitions, contracts, and views, and the R/R data including a click stream and transaction data. If the client application 102B provides upstream information, the primary data may include contracts and projects, with the auxiliary data including entitlement information and the R/R data including a click stream. If the client application 102C provides downstream information, the primary data may include approvables, with the auxiliary data including master data and the R/R data including transaction data.

Data streams can be transported as single documents, multi-part collections, or sets of documents. For each client application 102A, 102B, 102C, 102D, an indexing adapter 112A, 112B, 112C, 112D may be provided. Each indexing adapter 112A, 112B, 112C, 112D can include a parser created to parse document types supported by the corresponding client application 102A, 102B, 102C, 102D. As an example, the client application 102A providing catalog data may utilize the indexing adapter 112A, which may include a CIF parser (to parse primary CIF catalog data) and various XM parsers for the auxiliary data, such as kit information, a Units of Measure (UOM) map, etc. Each parser may have two modes. The first mode can parse the byte stream of the incoming documents into rows. The second mode can parse the rows into an indexable object.

As pictured, the indexing adapters 112A, 112B, 112C, 112D may actually be contained in the index and search manager 104. An index manager 114 may act to manage the indexing process. The index manager 114 may include a queue manager 116 which manages a queue 118 containing incoming data from the client applications 102A, 102B, 102C, 102D which needs to be indexed. The index manager 114 may act to send data at the front of the queue 118 to the appropriate indexing adapter 112A, 112B, 112C, 112D for the corresponding client application 102A, 102B, 102C, 102D while also building a request to an index builder 122.

In an example embodiment, the index manager 114 may have a redundant architecture that provides an application programming interface (API) to the client applications 102A, 102B, 102C, 102D to allow the client applications 102A, 102B, 102C, 102D to submit indexing jobs. The indexing message produced through the API may contain enough information to uniquely identify the request. This identification could be used to track the status of the submitted jobs.

The index manager 114 may utilize feedback from the distributed database 106 to decide on the indexing jobs to be run in the distributed database 106 to allow a scalable computing architecture for building index shards 120. Specifically, the index manager 114 may send a request to build an index to the index builder 122, which may build the index shards 120. A search core 124 may contain an index updater 126, which can take the index shards 120 and update a local index cache 128 using the index shards 120. This local index cache 128 can then be synchronized with a network file system, which can then distribute the index to the distributed database 106. Each index shard 120 is a subset of the index for a given file type. For example, an index shard 120 could include catalog items from a subset of tenants. For large catalogs, a single catalog may span multiple index shards 120.

The distributed database may 106 may contain a data access layer 130, a queue 132, tenant information 134, and documents 136.

The search core 124 may host a Lucene index and answer search queries via a search load balancer 138, which acts to balance the load of search requests among multiple instantiations of the search cores 124 on multiple physical or logical servers. The search core 124 may also expose a REST-based search and faceting API (not pictured). The search core 124 may perform aggregation, faceting, ranking, and relevance algorithms on search results. The source documents are primary indexing targets. Each source document may store a document identification key for auxiliary data. In an example embodiment, the auxiliary data itself is stored in the same index shard 120. This allows for locality of reference, so that access to an auxiliary data item related to a primary data item can be easily retrieved during a search.

The search core 124 may keep track of recent changes to the local index cache 128 in a special queue 140 receiving the updates to support searching. The updates may be immediately applied to the reader but may be batched before committing to the local index segments.

The index manager 114 may use information from the coordinator 108 and the sharding manager 110 to decide on the indexing jobs to be run in the distributed database 106 to allow a scalable computing architecture for building the index shards 120.

Each index shard 120 may contain Lucene index segments for a set of tenants, as will be described in more detail below. The job of indexing may be designed as a map-reduce job that parses the source document and any auxiliary documents to create the Lucene indexing segments.

Within the local index cache 128, the primary documents may be modeled as Lucene "documents". The document fields, their indexing properties (stored, indexed, etc.), norms, etc. may be modeled in the bundle providing the local index cache 128. The auxiliary document identifications may be stored in the Lucene document for linking the auxiliary data. The actual auxiliary documents may be stored in the same index as separate documents. For example, a single shard may contain documents relating to a first tenant, including a first catalog item (with item attributes and supplied identification), a second catalog item (with item attributes and supplied identification), a third catalog item (with item attributes and supplied identification), and a supplier document with three different supplier detail files. The supplier document is a single document, with the supplier detail files being auxiliary documents. The supplier document may be stored with a key matching the supplier identification field in each source document in the index.

The coordinator 108 may implement a protocol for routing, shard configuration, rolling-apply, and other management functions. The coordinator 108 may additionally provide the node status and consensus protocol.

Figure 2:
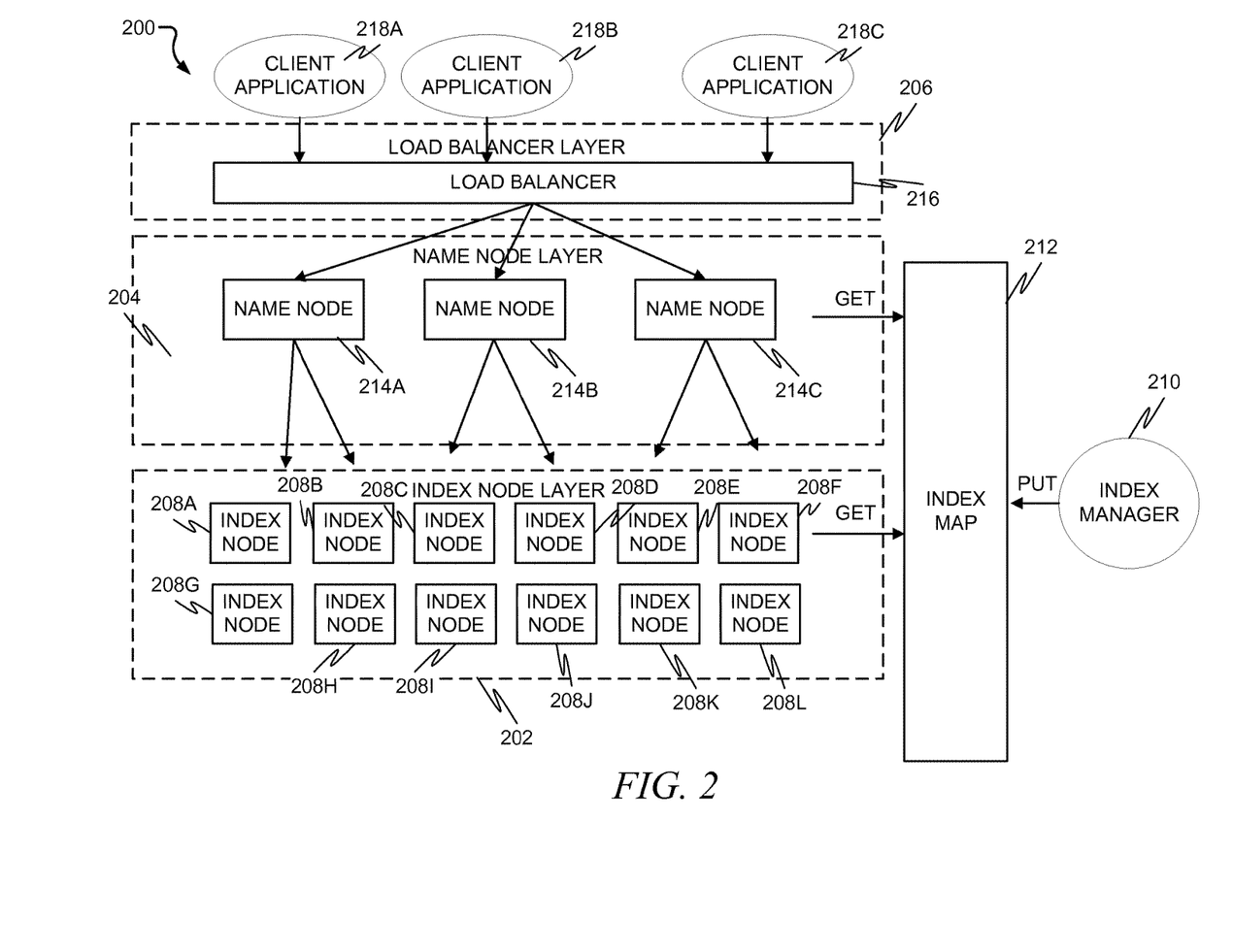
FIG. 2 is a block diagram illustrating a search infrastructure, in accordance with an example embodiment.

The sharding manager 110 may implement the elasticity architecture for distributing the index across search cores 124. In an example embodiment, the sharding manager 110 may receive a HyperText Transfer Protocol (HTTP) request for a search and be aware of which search core 124 can respond to this request. It can then route the request to the specific search core 124, perhaps based at least partially on load balancing if multiple search cores 124 can respond to the request. The search core 124 may then use libraries to parse the queries and launch a search and then respond with matches found in an Extensible Markup Language (XML) document. The XML document may comprise primary data along with the supporting auxiliary data FIG. 2 is a block diagram illustrating a search infrastructure 200 in accordance with an example embodiment. The search infrastructure 200 includes three layers: an index node layer 202, a name node layer 204, and a load balancer layer 206.

In an example embodiment, the index node layer 202 may comprise a plurality of index nodes 208A-208L, each index node 208A-208L comprising a virtual machine. In addition, each index node 208A-208L can be referred to as a shard. Each shard holds a piece of an index (or sometimes the whole index) for a given tenant. Index nodes 208A-208L are responsible executing searches on the index. It is possible that the entire tenant index fits in a single shard, but the design may assume that the tenant index may need to be distributed across multiple shards. The index manager 210 is responsible for mapping tenants to shards. The mapping information is stored in an index map 212. A federated query (query based on information from multiple sources) may be used if the tenant data is indexed to multiple shards. An index node 208A-208L may look at the tenant-to-shard mapping data stored in the index map 212 to determine if it needs to execute a local search or a federated search.

Elasticity may be accomplished by adding more index nodes 208A-208L as the index size grows or more tenants are added. Additionally, one failed data node should not cause searches to fail. In order to accomplish this, the index manager 210 can replicate the tenant data into two or more shards. In other words, any given index segment for a given tenant can be served by at least two index nodes 208A-208L.

The name node layer 204 may include a plurality of name nodes 214A-214C. Each name node 214A-214C may be an application responsible for mapping a client search request to an index node 208A-208L. Even though any index node 208A-208L may be capable of serving any search request, the goal of the name node 214A-214C is to select an index node 208A-208L that holds at least part of the tenant index. Thus, in the best-case scenario, the local search is executed by the index node 208A-208L that contains the data in its local index.

In an example embodiment, each name node 214A-214C may look at tenant-to-shard mapping data stored in the index map 212. The name node 214A-214C may perform a lookup on the index map 212 and then redirect the search request to the appropriate index node 208A-208L.

The load balancer layer 206 may include a load balancer 216, whose job it is to receive inbound search requests from client APPLICATIONS 218A-218C and invoke one or more name nodes 214A-214C to satisfy the search requests. The load balancer 216 acts to load balance these search requests among the name nodes 214A-214C.

The index manager 210 may be responsible for assigning tenants to shards. This mapping may be dynamic (e.g., the shards may be assigned to the tenants on demand at runtime). Elasticity may be accomplished by dynamically assigning available capacity to tenants on an as-needed basis.

In an example embodiment, the index manager 210 may include a tool used for capacity planning. The goal is to plan enough capacity to support the data needs for all the tenants.

In an example embodiment, the index manager 210 may be implemented by a set of nodes connected to a coordinator in an active-passive type configuration. One of the index manager nodes can be elected as the primary node by the coordinator. The backup index manager nodes can watch the "status" of the primary node and take over if needed. As will be described later, the index manager 210 can be collated with a queue manager. The primary API for the index manager 210 may be based on asynchronous queue-based messaging and therefore it makes sense to have the node play a dual role.

In an example embodiment, the index manager node subscribes to one or more tenant queues to receive indexing instructions. This may be the primary interface to the index manager 210. The index manager node may also be connected to the coordinator for watching the current shard configuration information.

Incoming messages may be classified based on the shard configuration, and new indexing tasks that can be created based on the type of messages. Table 1 below describes example structures of these messages:

TABLE 1

| Message | Schema | Description |
|---|---|---|
| <CIFType> | CIF<br>CIF File Path<br>DATA position<br>ENDOFDATA position<br>Num Items | Type definition for CIF catalog. |
| New Subscription | CIF: CIFType<br>CIF Edited File Path: CIFType<br>Tenant ID: String<br>Timestamp: long<br>Subscription Name: String<br>Closure Argument: String | Submits the new indexing task. |
| New Version | CIF: CIFType<br>CIF Edited File Path: CIFType<br>Tenant ID: String<br>Timestamp: long<br>Subscription Name: String<br>Closure Argument: String<br>Version: int | Creates a new version of the specified catalog. The incremental loaded version is relayed to active cores using a special NRTUpdate message. |
| Delete Version | Tenant ID: String<br>Timestamp: long<br>Subscription Name: String<br>Closure Argument: String<br>Version: int | Deletes a Version |
| Delete Subscription | Tenant ID: String<br>Timestamp: long<br>Subscription Name: String<br>Closure Argument: String | Delete all versions for a given subscription |

Figure 3:
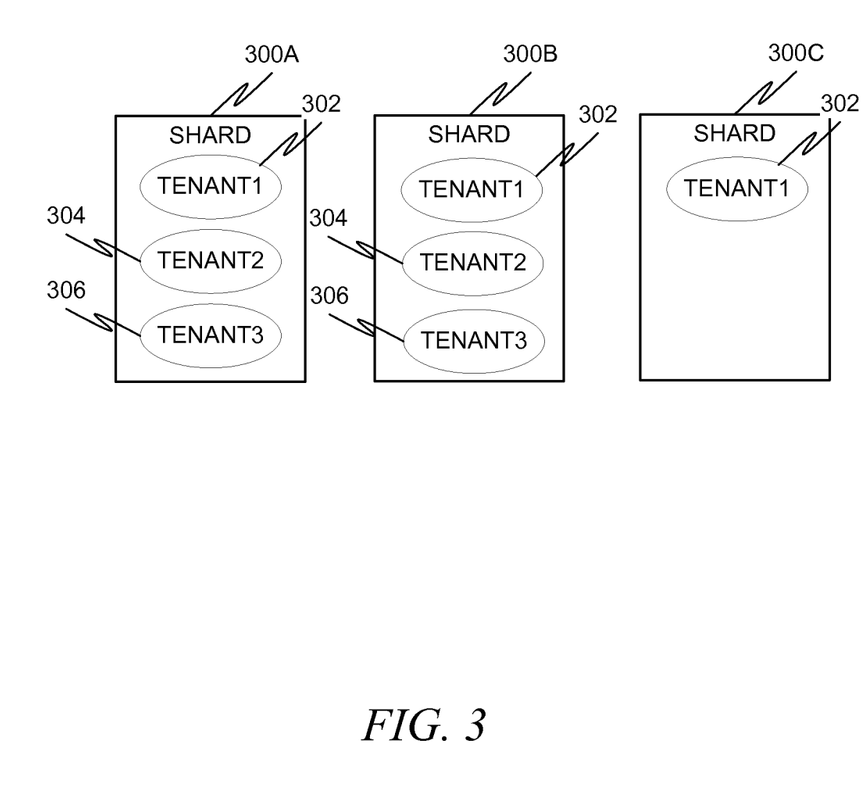
FIG. 3 is a diagram illustrating an example of elastic assignment of tenants to shards, in accordance with an example embodiment.

FIG. 3 is a diagram illustrating an example of elastic assignment of tenants to shards in accordance with an example embodiment. There are three shards 300A, 300B, 300C. The first tenant 302 may be the largest and may be distributed/copied among all three shards 300A, 300B, 300C. The second tenant 304 may be smaller and fit on a single shard, but for high availability purposes is replicated on both shards 300A and 300B. Likewise, a third tenant 306 may be smaller and fit on a single shard, but for high availability purposes is replicated on both shards 300A and 300B. Shard 300A and shard 300B may then be fully occupied, whereas shard 300C may have room for more tenants. The assignments depicted here may be dynamically assigned. Thus, for example, if the size of the first tenant 302 shrank significantly while the size of the second tenant 304 grew significantly, the tenants 302, 304 could be redistributed so that the first tenant 302 was only present on shard 300A and shard 300B while the second tenant 304 was present on all three shards 300A, 300B, 300C.

The total capacity of the search infrastructure is proportional to the number of index nodes. The capacity of an index node may be defined in terms of two parameters: index size (the amount of data it can support) and throughput (the number of search results it can handle per second).

The capacity requirement for a tenant may be specified via three variables: index size increment (capacity the tenant will need in a given time window, e.g., number of active catalog items or number of transactions per year), throughput (e.g., number of expected searches per second), and a replication factor (number of times the data has to be replicated to support HA needs, which in the above example is two).

The index map 212 may be the data structure used by the index manager 210 to store tenant-to-shard mappings. The data itself may be stored in the distributed database 130. In an example embodiment, the data structure is defined as described in Table 2.

TABLE 2

| Element name | Description | Usage |
| --- | --- | --- |
| segment_name | It can be tenant name, ANID or any other data segmentation field value. | |
| object_class | Index manager will index catalog, requisitions, cXML docs, etc. | |
| current_shard | List of shards containing the current data, e.g., shard-1a:shard-3b:shard45c. This means the current data for a given segment is replicated in shard-1a, shard-3b and shard-3c. | Index manager uses it for publishing tenant data. Index manager should update it when a tenant is assigned a new shard. |
| recent_shards | List of shards that contain the most recent data. Use some syntax to identify replication (e.g., shard-1a:shard-1b, shard24d:shard34c). | Used by data nodes to determine the data nodes to execute the federated query. Index manager should update it when a tenant is assigned a new shard. |
| all_shards | List of all shards in chronological order. | Data nodes use this to execute federated search for older data. |

In an example embodiment, each shard holds an index for multiple tenants. For each tenant, the index may include both primary data and auxiliary data. The primary data index can contain auxiliary reference keys.

Figure 4:
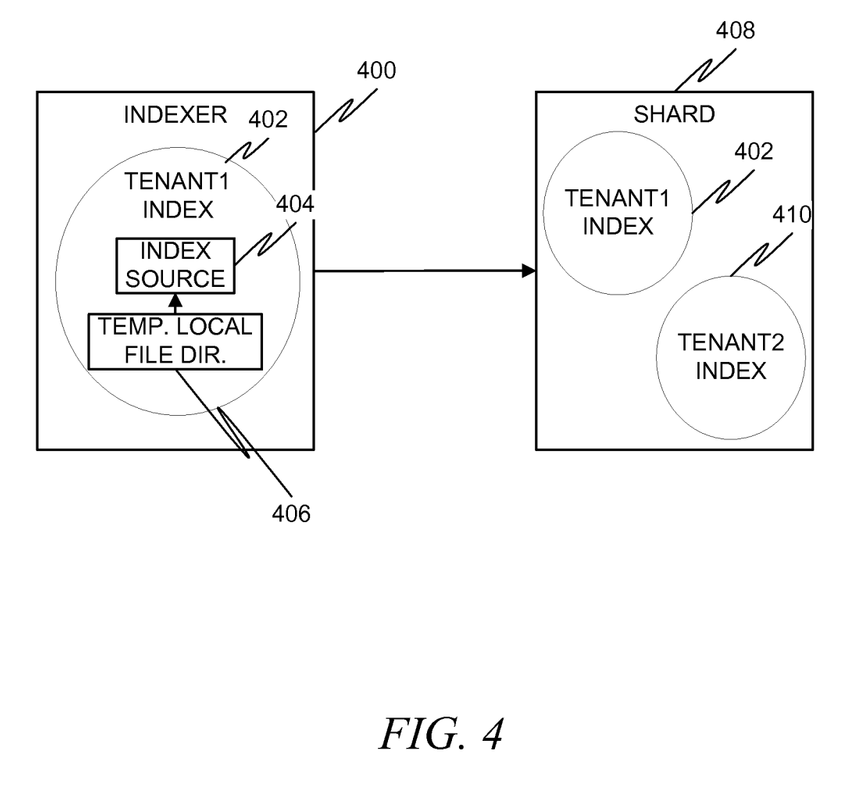
FIG. 4 is a diagram illustrating an indexer and a shard, in accordance with an example embodiment.

FIG. 4 is a diagram illustrating an indexer 400 and shard 408 in accordance with an example embodiment. Here, the indexer 400 may store a first tenant index 402. The first tenant index 402 may hold the index source 404 in the distributed database (e.g., the distributed database 130 of FIG. 1). When the indexer 400 receives a publish request, it can copy the index to a temporary local file directory 406, update the first tenant index 402 with data from the request, then copy the first tenant index 402 back to the distributed database. After the whole first tenant index 402 is ready, it can be written to the corresponding shard 408, where it can be stored with a second tenant index 410.

In an example embodiment, each shard represents a final manifestation of a Lucene index ready for searching.

In an example embodiment, full indexing of data can be performed as needed. This is in contrast to previous solutions which could not change the shape of the index.

In an example embodiment, the search component and the indexing component are kept separate, which allows them to run independently and potentially simultaneously. For example, while one tenant is uploading additional data for a catalog to be indexed to the indexing component, another tenant could be searching an existing version of the catalog.

Figure 5:
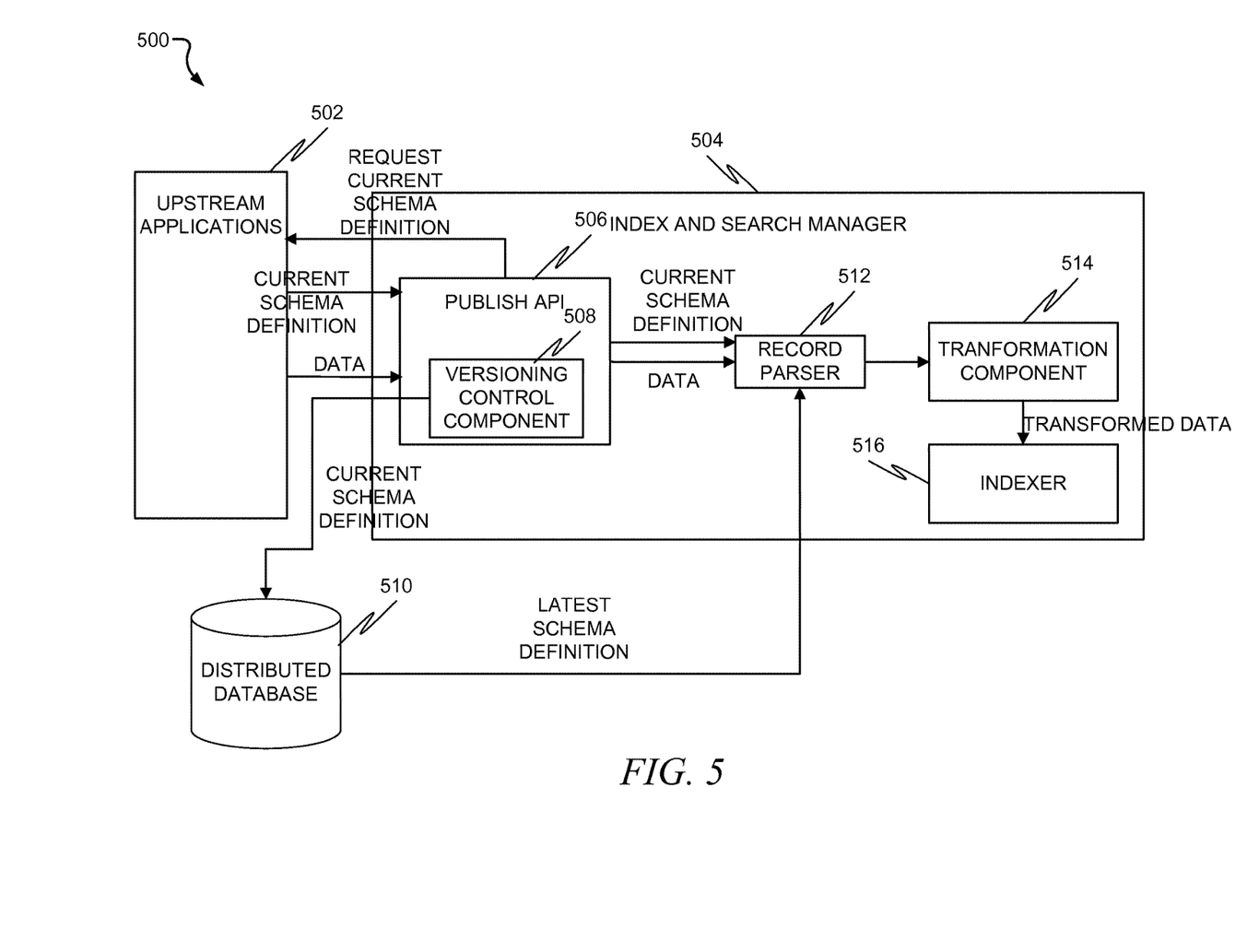
FIG. 5 is a diagram illustrating a system for schema versioning, in accordance with an example embodiment.

As described earlier, in an example embodiment, schema versioning and schema evolution is applied to data in a multi-tenant environment. FIG. 5 is a block diagram illustrating a system 500, in accordance with an example embodiment, for schema versioning. Here, one or more upstream applications 502 send data to an index and search manager 504 to be stored and indexed. The data may be a set of records, each record stored in a particular schema. The data may identify the schema using, for example, a schema identifier and a schema version. The schema identifier may uniquely identify the schema. The schema version number may identify the version of the schema, and thus may uniquely correspond to a specific definition for the schema. In an example embodiment, the upstream applications 502 send the data to a publish API 506. The publish API 506 acts to read the data, parse the data, index the data, and activate the data. A versioning control component 508 within the publish API 506 may act to, during the reading stage, perform a lookup in a schema table to see whether a schema definition corresponding to the data is stored in the schema table. In an example embodiment, the schema table is stored in a distributed database 510, such as an HBase. If the publish API 506 cannot find a matching schema definition in the schema table, it may download the schema definition from the corresponding upstream application 502 and store it in the schema table.

During the parsing stage, a record parser 512 may store primary data as normal (e.g., in a primary data table), but a schema version number may additionally be stored for the data (e.g., also in the primary data table). In an example embodiment, this schema version number includes a major number (to signify a major change in the schema) and a minor number (to signify a minor change in the schema). For example, the schema version number 4.2 would have a major number of 4, indicating that this is the fourth major update, and a minor number of 2, indicating that this is the second minor update of the fourth major update.

During the indexing stage, the primary data and its schema definition are read. Then, the most recent schema definition for the schema indicated by the schema version number is read. This may be accomplished by retrieving the schema definition having the latest (e.g., highest) version number. Then schema evolution is applied to convert the data from the current schema definition to the latest schema definition by a transformation component 514. Once conversion is successful, the data is indexed using the latest schema definition by an indexer 516.

In an example embodiment, the storing of the schema definitions may be performed in such a way that the latest schema definition is retrieved first, rather than last, speeding up the step of retrieving the latest version of the schema. Specifically, the schema record may be stored using a row key, such as: s4.1839246.1^company.s4. To provide multiple schema version support, the row key would have to change to append the schema version as well. This would make row key values such as:

Row key: s4.1839246.1^company.s4^1.1
Row key: s4.1839246.1^company.s4^1.2
Row key: s4.1839246.1^company.s4^1.3
Row key: s4.1839246.1^company.s4^1.4

Storing schema data using the above row keys would slow down fetching the latest schema version, as the system would have to fetch all the records to find the most recent schema version.

In order to improve performance, in an example embodiment, the row key is created by subtracting the major number of the version number from 999 and subtracting the minor number of the version number from 99999.

For schema version 1.4, the row key would be: s4.I839246.1^company.s4^998.99995

For schema version 1.3, the row key would be: s4.I839246.1^company.s4^998.99996

For schema version 1.2, the row key would be: s4.I839246.1^company.s4^998.99997

For schema version 1.1, row key would be: s4.I839246.1^company.s4^998.99998

Since HBase stores data in ascending order of the row key, the latest schema version will always be stored first.

Figure 6:
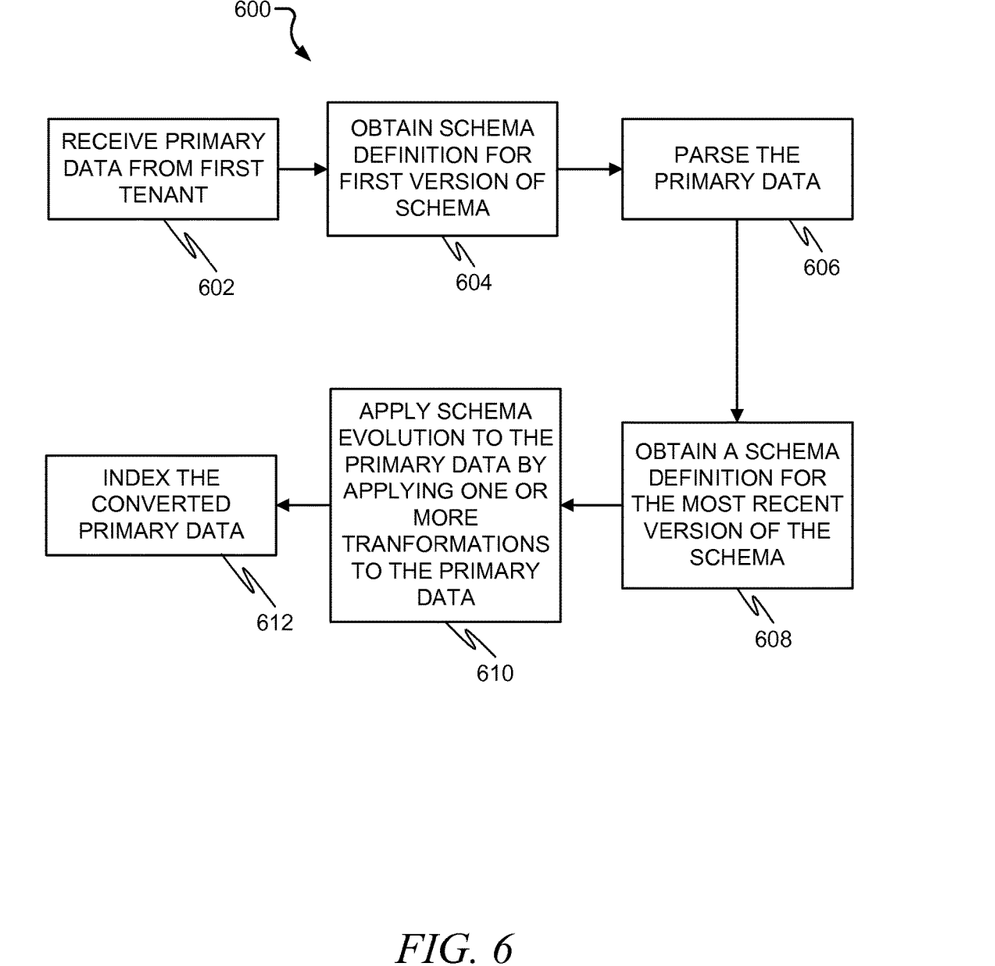
FIG. 6 is a flow diagram illustrating a method, in accordance with an example embodiment, of performing schema evolution.

FIG. 6 is a flow diagram illustrating a method 600, in accordance with an example embodiment, of performing schema evolution. At operation 602, primary data is received from a first tenant in a computer network, the primary data formatted based on a first version of a schema. At operation 604, a schema definition is obtained for the first version of the schema. Then, at operation 606 the primary data is parsed. This parsing may include, for example, storing a schema version number for the first version of the schema. Then the primary data can be indexed. This indexing may comprise operations 608-612. At operation 608, a schema definition for a most recent version of the schema is obtained using the schema version number for the first version of the schema. Then schema evolution is applied to the primary data at operation 610. This may involve applying one or more transforms to the primary data, the one or more transforms created using the schema definition for the most recent version of the schema and the schema definition for the first version of the schema, causing the primary data to be converted to the most recent version of the schema. At operation 612, the converted primary data is indexed.

Example Mobile Device

Figure 7:
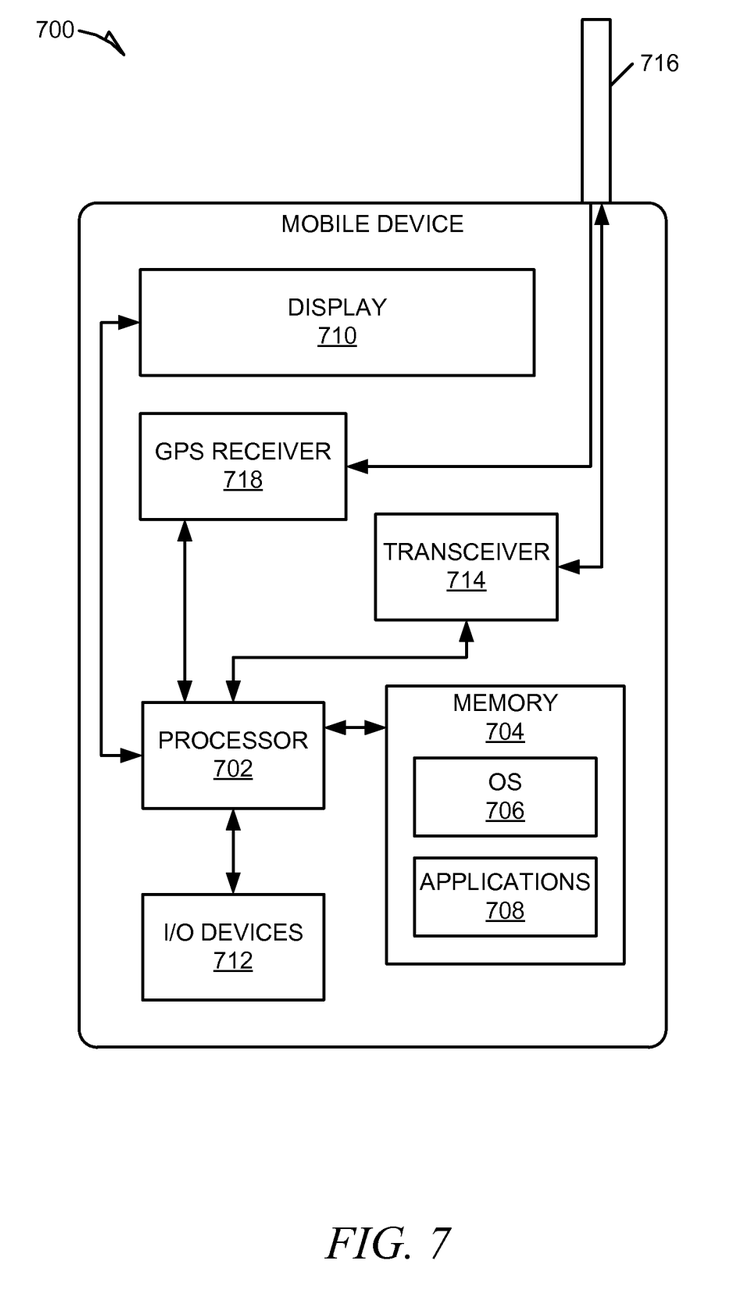
FIG. 7 is a block diagram illustrating a mobile device, according to an example embodiment.

FIG. 7 is a block diagram illustrating a mobile device 700, according to an example embodiment. The mobile device 700 may include a processor 702. The processor 702 may be any of a variety of different types of commercially available processors 702 suitable for mobile devices 700 (for example, an XScale architecture microprocessor, a microprocessor without interlocked pipeline stages (MIPS) architecture processor, or another type of processor 702). A memory 704, such as a random access memory (RAM), a flash memory, or another type of memory, is typically accessible to the processor 702. The memory 704 may be adapted to store an operating system (OS) 706, as well as applications 708, such as a mobile location-enabled application that may provide location-based services to a user. The processor 702 may be coupled, either directly or via appropriate intermediary hardware, to a display 710 and to one or more input/output (I/O) devices 712, such as a keypad, a touch panel sensor, a microphone, and the like. Similarly, in some embodiments, the processor 702 may be coupled to a transceiver 714 that interfaces with an antenna 716. The transceiver 714 may be configured to both transmit and receive cellular network signals, wireless data signals, or other types of signals via the antenna 716, depending on the nature of the mobile device 700. Further, in some configurations, a GPS receiver 718 may also make use of the antenna 716 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors (e.g., processor 702) may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 8:
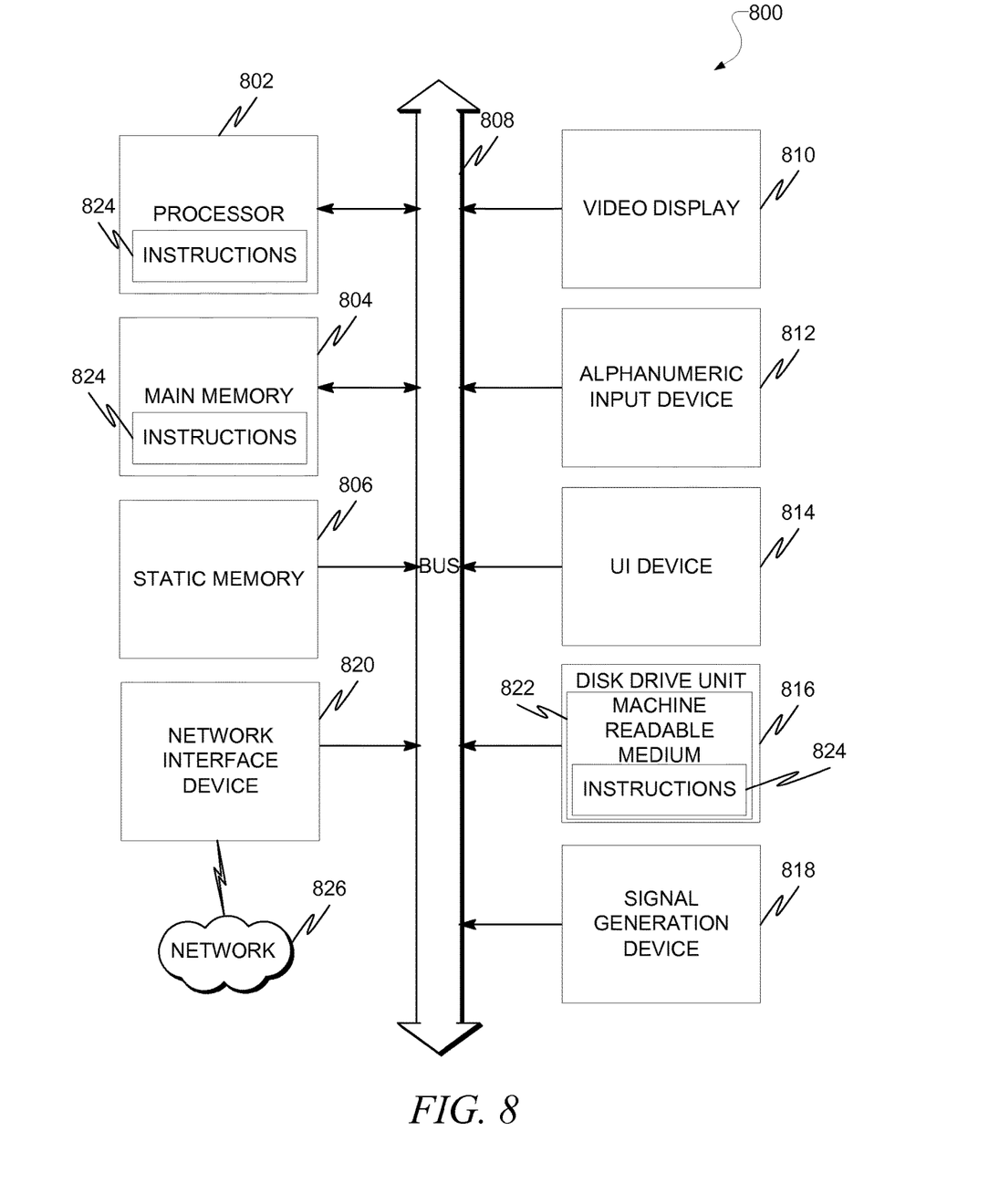
FIG. 8 is a block diagram of a machine in the example form of a computer system within which instructions may be executed for causing the machine to perform any one or more of the methodologies discussed herein.

FIG. 8 is a block diagram of machine in the example form of a computer system 800 within which instructions 824 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU), or both), a main memory 804, and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard or a touch-sensitive display screen), a user interface (UI) navigation (or cursor control) device 814 (e.g., a mouse), a disk drive unit 816, a signal generation device 818 (e.g., a speaker), and a network interface device 820.

Machine-Readable Medium

The disk drive unit 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804 and/or within the processor 802 during execution thereof by the computer system 800, with the main memory 804 and the processor 802 also constituting machine-readable media 822.

While the machine-readable medium 822 is shown in an example embodiment to be a single medium, the term "machine-readable medium" may include a single medium or multiple media (e.g., a centralized or distributed database, and/or associated caches and servers) that store the one or more instructions 824 or data structures. The term "machine-readable medium" shall also be taken to include any tangible medium that is capable of storing, encoding, or carrying instructions 824 for execution by the machine and that cause the machine to perform any one or more of the methodologies of the present disclosure, or that is capable of storing, encoding, or carrying data structures utilized by or associated with such instructions 824. The term "machine-readable medium" shall accordingly be taken to include, but not be limited to, solid-state memories, and optical and magnetic media. Specific examples of machine-readable media 822 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 824 may further be transmitted or received over a communication network 826 using a transmission medium. The instructions 824 may be transmitted using the network interface device 820 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 824 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   receiving primary data from a first tenant in a computer network, the primary data formatted based on a first version of a schema for a database;
   obtaining a schema definition for the first version of the schema, the schema definition providing a set of integrity constraints imposed on the database;
   parsing, using at least one hardware processor, the primary data, the parsing including storing a schema version number for the first version of the schema; and
   indexing, using the at least one hardware processor, the primary data, the indexing comprising:
   obtaining, using the schema version number for the first version of the schema, a schema definition for a most recent version of the schema, the schema definition for the most recent version of the schema being obtained prior to obtaining the schema definition for older versions of the schema;
   applying schema evolution to the primary data by applying one or more transforms to the primary data, the one or more transforms defining one or more rules that, when executed, transform the primary data into the most recent version of the schema, the one or more transforms created using the schema definition for the most recent version of the schema and the schema definition for the first version of the schema; and
   indexing, using the at least one hardware processor, the converted primary data.

2. The method of claim 1, wherein the receiving and obtaining a schema definition are performed by an application program interface (API).

3. The method of claim 1, wherein the schema definition for the first version of the schema is obtained from a distributed database.

4. The method of claim 1, wherein the parsing is performed by a record parser that stores the primary data along with the schema version number.

5. The method of claim 1, wherein the storing of the schema version number is performed using a row key.

6. The method of claim 5, wherein the row key is created by subtracting a major number of the schema version number from 999 and subtracting a minor number of the schema version number from 99999.

7. The method of claim 5, wherein the row key is created so that when the schema version number is stored, a latest schema version number is always stored as being first in a resulting data structure.

8. A system comprising:
   a distributed database;
   an index and search manager executable on one or more hardware processors, the index and search manager comprising:
   a versioning control component configured to:
   receive primary data from a first tenant in as computer network, the primary data formatted based on a first version of a schema for a database;
   obtain a schema definition for the first version of the schema, the schema definition providing a set of integrity constraints imposed on the database, the schema definition for the most recent version of the schema being obtained prior to obtaining the schema definition for older versions of the schema; and
   store a schema version number for the first version of the schema;
   a record parser configured to obtain, using the schema version number for the first version of the schema, a schema definition for a most recent version of the schema,
   at transformation component configured to apply schema evolution to the primary data by applying one or more transforms to the primary data, the one or more transforms defining one or more rules that, when executed, transform the primary data into the most recent version of the schema, the one or more transforms created using the schema definition for the most recent version of the schema and the schema definition for the first version of the schema; and an indexer configured to index the converted primary data.

9. The system of claim 8, wherein the schema definition of the first version of the schema is obtained from a distributed database.

10. The system of claim 8, wherein the storing of the schema version number is preferred using a row key.

11. The system of claim 10, wherein the row key is created by subtracting a major number of the schema version number from 999 and subtracting a minor number of the schema version number from 99999.

12. The system of claim 10, wherein the row key is created so that when the schema version number is stored, a latest schema version number is always stored as being first in a resulting data structure.

13. The system of claim 8, wherein the versioning control component is part of a publish API.

14. A non-transitory machine readable storage medium comprising instructions, which when implemented by one or more machines, cause the one or more machines to perform operations comprising:

receiving primary data from a first tenant in a computer network, the primary data formatted based on a first version of a schema for a database;

obtaining a schema definition for the first version of the schema, the schema definition providing a set of integrity constraints imposed on the database;

parsing, using at least one hardware processor, the primary data, the parsing including storing a schema version number for the first version of the schema, and indexing, using the at least one hardware processor, the primary data, the indexing comprising:

obtaining, using the schema version number for the first version of the schema, a schema definition for a most recent version of the schema, the schema definition for the most recent version of the schema being obtained prior to obtaining the schema definition for older versions of the schema;

applying schema evolution to the primary data by applying one or more transforms to the primary data, the one or more transforms defining one or more rules that, when executed, transform the primary data into the most recent version of the schema, the one or more transforms created using the schema definition for the most recent version of the schema and the schema definition for the first version of the schema; and indexing, using the at least one hardware processor, the converted primary data.

15. The non-transitory machine-readable storage medium of claim 14, wherein the receiving and obtaining, a schema definition are performed by an application program interface (API).

16. The non-transistor machine-readable storage medium of claim 14, wherein the schema definition for the first version of the schema is obtained from a distributed database.

17. The non-transitory machine-readable storage medium of claim 14, wherein the parsing is performed by a record parser that stores the primary data along with the schema version number.

18. The non-transitory machine-readable storage medium of claim 14, wherein the storing of the schema version number is performed using a row key.

19. The non-transitory machine-readable storage medium of claim 18, wherein the row key is created by subtracting a major number of the schema version number from 999 and subtracting a minor number of the schema version number from 99999.

20. The non-transitory machine-readable storage medium of claim 18, wherein the row key is created so that when the schema version number is stored, a latest schema version number is always stored as being first in a resulting data structure.

* * * * *